United States Patent Office 3,076,034
Patented Jan. 29, 1963

3,076,034
PREPARATION OF TERTIARY PHOSPHINE
OXIDES
Irving Gordon, Niagara Falls, N.Y., assignor to Hooker
Chemical Corporation, Niagara Falls, N.Y., a corporation of New York
No Drawing. Filed Feb. 5, 1960, Ser. No. 6,847
20 Claims. (Cl. 260—606.5)

This invention relates to the preparation of tertiary phosphine oxides.

Tertiary phosphine oxides have been used as intermediates in the preparation of other phosphorus compounds, to improve the thermal stability of silicone rubber, to improve the color of acrylonitrile polymers, polyester resins and alkyd resins, and to flameproof cellulosic materials.

Heretofore it has not been possible to prepare substantially pure tertiary phosphine oxides from tetrakis (α-hydroxyorgano) phosphonium compounds without employing numerous complicated and costly purification steps. For example, Alfred Hoffman, in the Journal of the American Chemical Society, vol. 43 (1921), pp. 1684–1688, and vol. 52 (1930), pp. 2995–2998, discloses the reaction between tetrakis (hydroxymethyl) phosphonium chloride and sodium hydroxide to form a highly viscous reaction product mixture containing tris(hydroxymethyl) phosphine oxide, formaldehyde and sodium chloride. Costly extraction, recrystallization, and/or filtration steps are necessary to isolate tertiary phosphine oxide from such a mixture. Without such purification steps, the isolated product is generally highly contaminated with aldehyde and salt.

Accordingly, it is a primary object of this invention to provide an improved and efficient method of preparing tertiary phosphine oxides.

Another object of the invention is to provide a method of preparing tertiary phosphine oxides wherein the product can be readily isolated in a pure form, as contrasted to the tedious and laborious processing steps required in prior art techniques.

Still another object of this invention is to prepare pure tertiary phosphine oxides in high yields.

It is another object of this invention to provide an improved and efficient method of preparing tris(hydroxymethyl) phosphine oxide.

These and other objects of the invention will be apparent from the following detailed description.

It has now been discovered that tertiary phosphine oxide is produced in high yield and high purity by reacting a tetrakis (α-hydroxyorgano) phosphonium compound, an alkali metal sulfite and water in an alkaline medium, and recovering tertiary phosphine oxide from the reaction mass. When an alkali metal sulfite is employed as a reactant, organic by-products of the reaction form as bisulfite salts, which are readily separated from the tertiary phosphine oxide product by solvent extraction and/or ion exchange techniques. In contrast, when no alkali metal sulfite is used in the reaction, as in prior art techniques, organic by-products are in a form which is not readily separated, and costly purification steps are required to separate pure tertiary phosphine oxide from the reaction mass.

More in detail, any tetrakis (α-hydroxyorgano) phosphonium compound capable of forming an aldehyde, a methyl ketone, or a cyclic ketone in a basic medium may be employed. This type of phosphonium compound may be represented by the general formula:

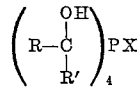

where R and R' are selected from the group consisting of hydrogen, alkyl, aryl and cycloalkyl, and X represents a monovalent anion, as defined more fully hereinafter. The radicals designated by R and R' may also be substituted, if desired, with halogens. Typical examples of radicals represented by (RR'COH) in the aforesaid formula are those derived from aldehyde, ketone or monosubstituted derivatives of benzaldehyde compounds such as formaldehyde, acetaldehyde, chloral, glyoxal, propionaldehyde, n-butyraldehyde, isobutyraldehyde n-valeraldehyde, isovaleraldehyde, n-caproaldehyde, n-heptaldehyde, stearaldehyde, acrolein, crotonaldehyde, benzaldehyde, furfural, acetone, methyl ethyl ketone, chloroacetone, diacetyl, acetylacetone, cyclohexanone, methyl propyl ketone, methyl butyl ketone, benzaldehyde, m-tolualdehyde, p-tolualdehyde, o-chlorobenzaldehyde, p-chlorobenzaldehyde, o-nitrobenzaldehyde, m-nitrobenzaldehyde, p-chlorobenzaldehyde, o-aminobenzaldehyde, salicylaldehyde, m-hydroxybenzaldehyde, p-hydroxybenzaldehyde, o-methoxybenzaldehyde, anisaldehyde, and p-dimethylaminobenzaldehyde.

In the aforesaid general formula, X represents the monovalent anion of acids such as aromatic carboxylic acids, carboxylic acids, benzene derivatives having at least one acidic side chain, dibasic acids, and inorganic acids. Typical examples of radicals represented by X are the monovalent anions of aromatic carboxylic acids containing no more than 12 carbon atoms, such as benzoic, o-toluic, m-toluic, p-toluic, o-chlorobenzoic, m-chlorobenzoic, p-chlorobenzoic, o-bromobenzoic, m-bromobenzoic, p-bromobenzoic, o-nitrobenzoic, p-nitrobenzoic, m-nitrobenzoic, 3,5-dinitrobenzoic, salicyclic, m-hydroxybenzoic, p-hydroxybenzoic, anisic, gallic, syringic, anthranilic, m-aminobenzoic, and p-aminobenzoic acids. Additional examples are the benzene derivatives with acidic side chains including hydrocinnamic, γ-phenylbutyric, δ-phenyl-n-valeric, ε-phenyl-n-caproic, cinnamic (trans), phenylpropiolic, homophthalic, o - phenylenediacetic, m-phenylenediacetic, p-phenylenediacetic, and o-phenyleneacetic-β-propionic acids.

Examples of carboxylic acids containing no more than 9 carbon atoms, include formic, acetic, propionic, n-butyric, isobutyric, n-valeric, trimethylacetic, caproic, n-heptylic, caprylic, pelargonic, fluoroacetic, chloroacetic, bromoacetic, iodoacetic, dichloroacetic, trichloroacetic, α-chloropropionic, β-chloropropionic, glycolic, lactic, methoxyacetic, thioglycolic, cyanoacetic, glyoxylic, malonic, acrylic, vinylacetic, and phenylacetic acids.

Examples of aromatic polybasic carboxylic acids containing no more than 12 carbon atoms, include phthalic, isophthalic, terephthalic, hemimellitic, trimellitic, trimesic, prehnitic, mellophanic, pyromellitic, benzenepentacarboxylic and mellitic acids.

Suitable dibasic acids containing no more than 10 carbon atoms include oxalic, malonic, succinic, glutaric, adipic, pimelic, suberic, azelaic, and sebacic acids.

Typical examples of inorganic acids include arsenic, arsenious, boric, carbonic, hydrazoic, hydrofluoric, hypophosphorous, nitrous, phosphoric, phosphorous, pyrophosphoric, silicic, sulfuric, sulfurous, hydrochloric, hydrobromic, chloric, and perchloric acids.

Typical examples of suitable tetrakis (α-hydroxyorgano) phosphonium compounds are as follows:

(1)  $(HOCH_2)_4PCl$ (2)  $(HOCH_2)_4PBr$ (3) 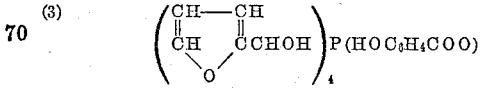

(4) $(CH_3(CH_2)_3CHOH)_4P(o\text{-}ClC_6H_4COO)$ (5) $\left(CH_2=CH\underset{OH}{\overset{H}{\underset{|}{C}}}-\right)_4 P(p\text{—}ClC_6H_4CO_2)$ (6) $\left(CH_3CH=CH\underset{OH}{\overset{H}{\underset{|}{C}}}-\right)_4 P(p\text{—}NO_2C_6H_4COO)$ (7) $\left(C_6H_5\underset{H}{\overset{OH}{\underset{|}{C}}}\right)_4 P(3,4,5\text{—}(HO)_3C_6H_2COO)$ (8) $\left(CH_3\underset{CH_2Cl}{\overset{OH}{\underset{|}{C}}}-\right)_4 P(o\text{—}NH_2C_6H_4COO)$ (9) $\left(ClCH_2\underset{ClCH_2}{\overset{OH}{\underset{|}{C}}}-\right)_4 P(C_6H_5CH_2COO)$

(10) $\left((CH_3)_2C=CH\underset{CH_3}{\overset{OH}{\underset{|}{C}}}-\right)_4 P(C_6H_5CH=CHCOO)$

(11) $\left(\begin{array}{c}CH_2CH_2\\CH_2\\CH_2CH_2\end{array}\!\!\!\!C\underset{}{\overset{OH}{\underset{|}{}}}-\right)_4 P\!\left(\underset{(CH_2)_8COOH}{\overset{COO}{\underset{|}{}}}\right)$

(12) $\left(C_6H_5\underset{H}{\overset{OH}{\underset{|}{C}}}-\right)_4 P\!\left(\underset{(CH_2)_4COOH}{\overset{COO}{\underset{|}{}}}\right)$

(13) $(HOCH_2)_4P(H_2AsO_4)$
(14) $(HOCH_2)_4P(HSO_3)$
(15) $(HOCH_2)_4P(H_2PO_4)$
(16) $(HOCH_2)_4P(H_2PO_3)$
(17) $(HOCH_2)_4P(CH_3CH_2COO)$
(18) $(HOCH_2)_4P(CH_2ClCOO)$
(19) $(HOCH_2)_4P(CH_3OCH_2COO)$
(20) $(HOCH_2)_4P(CCl_3COO)$
(21) $(HOCH_2)_4P(CH_2=CHCH_2COO)$

(22) $\left(HO\underset{CH_3}{\overset{CH_3}{\underset{|}{C}}}-\right)_4 P(C_6H_5(CH_2)_2COO)$

(23) $(HOCH_2)_4P(o\text{—}CH_3C_6H_4COO)$
(24) $(HOCH_2)_4P(o\text{—}BrC_6H_4COO)$
(25) $(HOCH_2)_4P(CHCl_2COO)$

(26) $\left(HO-\underset{CH_3}{\overset{CH_3}{\underset{|}{C}}}-\right)_4 P(CH_3CHClCOO)$

(27) $\left(CH_3-\underset{CH_2CH_3}{\overset{OH}{\underset{|}{C}}}-\right)_4 P(HSO_4)$

(28) $\left(CH_3CH_2CH_2\underset{OH}{\overset{H}{\underset{|}{C}}}-\right)_4 PBr$ Tetrakis (hydroxymethyl) phosphonium halides are preferably employed as the tetrakis (α-hydroxyorgano) phosphonium compound. Suitable alkali metal sulfites that may be employed as a reactant in the instant novel process include sodium sulfite, sodium bisulfite, potassium sulfite, potassium bisulfite, lithium sulfite, lithium bisulfite, and mixtures thereof. The term "alkali metal sulfite," as used throughout the description and claims, is intended to include at least one of the aforesaid alkali metal sulfites and alkali metal bisulfites. However, any compound capable of converting the organic by-products to an ionic structure may be employed.

The reaction is carried out under alkaline conditions, preferably at a pH between about 9.0 and about 11.5. Any basic compound capable of adjusting the pH of the reaction mixture to above about 7.0 may be employed.

Typical examples of suitable basic compounds are sodium hydroxide, potassium hydroxide, sodium carbonate, potassium carbonate, guanidine, tetraphenyl-guanidine and mixtures thereof. Sodium hydroxide is preferably employed as the basic compound.

The overall reaction involved in the production of tris (α-hydroxyorgano) phosphine oxides in accordance with the process of the instant invention is represented by the equation:

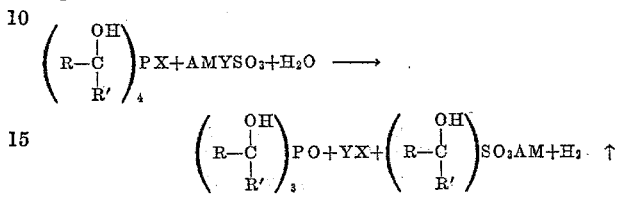

where R, R' and X have the significance described above, AM represents an alkali metal, and Y represents an alkali metal or hydrogen.

Typical reactions within the scope of the invention are as follows:

(1) $(HOCH_2)_4PCl + AM_2SO_3 + H_2O \rightarrow$
$(HOCH_2)_3PO + AMCl + HOCH_2SO_3AM + H_2\uparrow$ (2) $(HOCH_2)_4PBr + AM_2SO_3 + H_2O \rightarrow$
$(HOCH_2)_3PO + AMBr + HOCH_2SO_3AM + H_2\uparrow$ (3) $\left(\underset{CH_3}{\overset{HOCH}{\underset{|}{}}}\right)_4 PCl + AM_2SO_3 + H_2O \longrightarrow$ $\left(\underset{CH_3}{\overset{HOCH}{\underset{|}{}}}\right)_3 PO + AMCl + HO\underset{CH_3}{\overset{HOCH}{\underset{|}{}}}-SO_3AM + H_2\uparrow$ (4) $\left(\underset{CH_3}{\overset{HOCH}{\underset{|}{}}}\right)_4 PBr + AM_2SO_3 + H_2O \longrightarrow$ $\left(\underset{CH_3}{\overset{HOCH}{\underset{|}{}}}\right)_3 PO + AMBr + HO\underset{CH_3}{\overset{CH}{\underset{|}{}}}-SO_3AM + H_2\uparrow$ (5) $\left(\underset{CH_3}{\overset{HOCH}{\underset{|}{}}}\right)_4 POH + AM_2SO_3 + H_2O \longrightarrow$ $\left(\underset{CH_3}{\overset{HOCH}{\underset{|}{}}}\right)_3 PO + AMOH + HO\underset{CH_3}{\overset{CH}{\underset{|}{}}}-SO_3AM + H_2\uparrow$ (6) $\left(HO\underset{CH_3}{\overset{CH_3}{\underset{|}{C}}}-\right)_4 PCl + AM_2SO_3 + H_2O \longrightarrow$ $\left(HO\underset{CH_3}{\overset{CH_3}{\underset{|}{C}}}-\right)_3 PO + AMCl + HO\underset{CH_3}{\overset{CH_3}{\underset{|}{C}}}-SO_3AM + H_2\uparrow$ (7) $\left(HO\underset{CH_3}{\overset{CH_3}{\underset{|}{C}}}-\right)_4 PBr + AM_2SO_3 + H_2O \longrightarrow$ $\left(HO\underset{CH_3}{\overset{CH_3}{\underset{|}{C}}}-\right)_3 PO + AMBr + HO\underset{CH_3}{\overset{CH_3}{\underset{|}{C}}}-SO_3AM + H_2\uparrow$ (8) $\left(HO\underset{CH_3}{\overset{CH_3}{\underset{|}{C}}}-\right)_4 POH + AM_2SO_3 + H_2O \longrightarrow$ $\left(HO\underset{CH_3}{\overset{CH_3}{\underset{|}{C}}}-\right)_3 PO + AMOH + HO\underset{CH_3}{\overset{CH_3}{\underset{|}{C}}}-SO_3AM + H_2\uparrow$ (9) 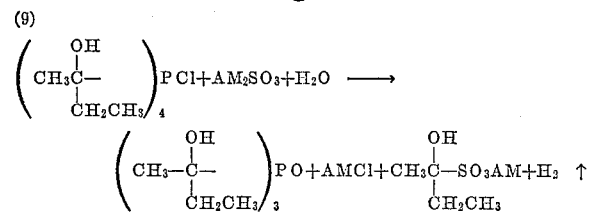
(10) 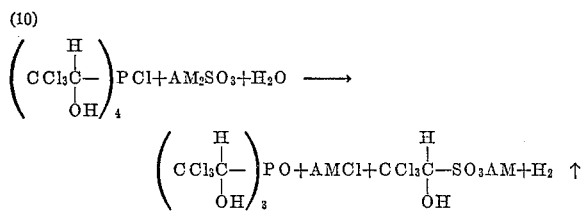
(11) 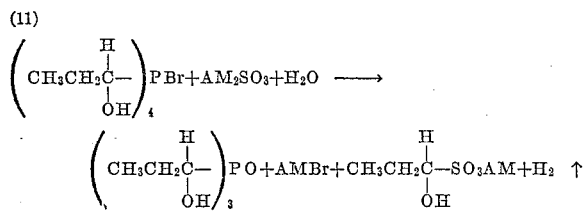
(12) 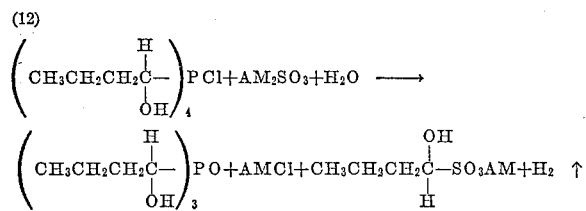
(13) 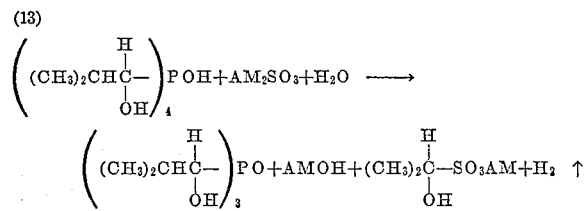
(14) 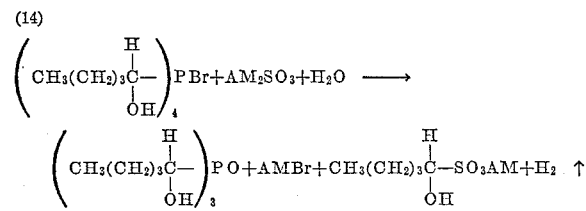
(15) 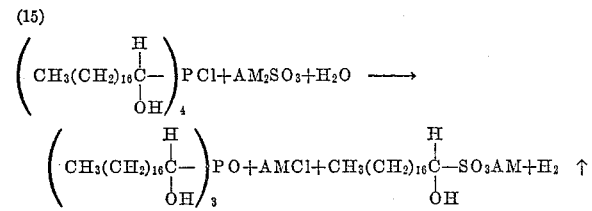
(16) 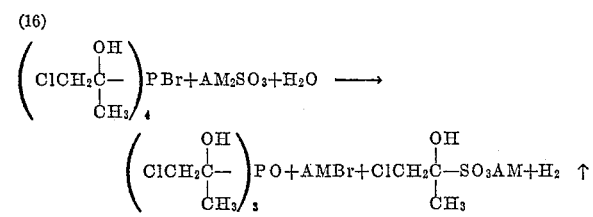
(17) 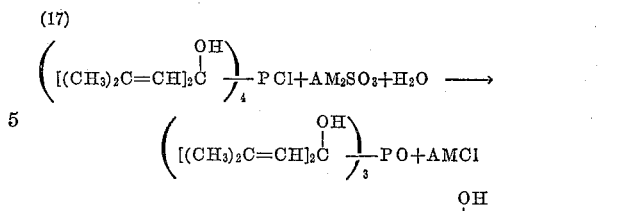
(18) 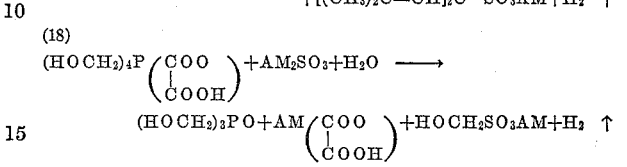
(19) 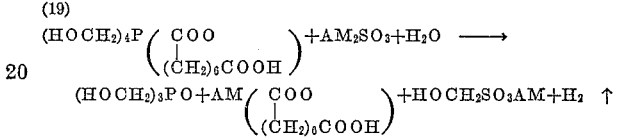
(20) 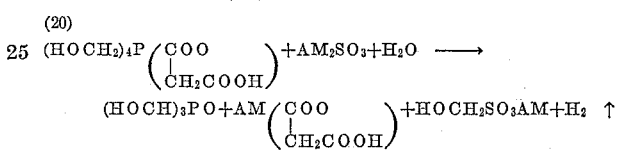
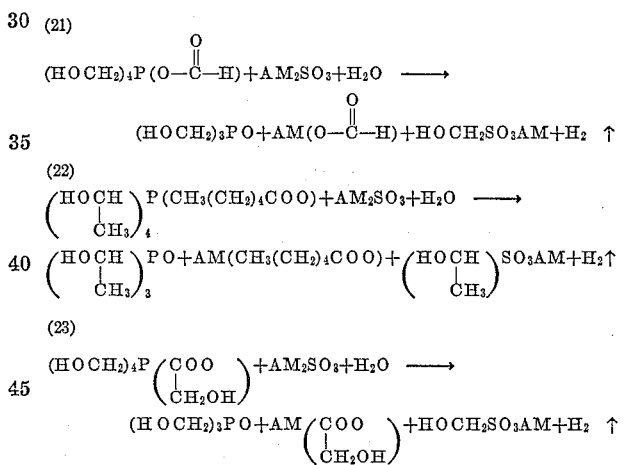
(26) $(HOCH_2)_4P(H_3P_2O_7) + AM_2SO_3 + H_2O \rightarrow$
$(HOCH_2)_3PO + AM(H_3P_2O_7)$
$+ (HOCH_2)SO_3AM + H_2\uparrow$
(27) $(HOCH_2)_4P(HSO_4) + AM_2SO_3 + H_2O \rightarrow$
$(HOCH_2)_3PO + AM(HSO_4) + HOCH_2SO_3AM + H_2\uparrow$
(28) $(HOCH_2)_4P(H_2PO_2) + AM_2SO_3 + H_2O \rightarrow$
$(HOCH_2)_3PO + AM(H_2PO_2) + HOCH_2SO_3AM + H_2\uparrow$
(29) 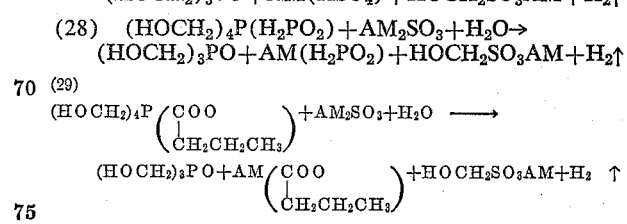

(30)
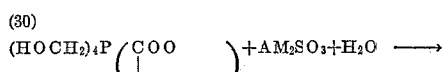
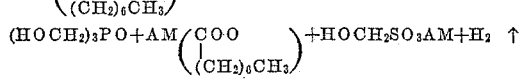

(31)
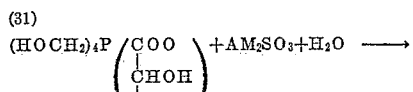
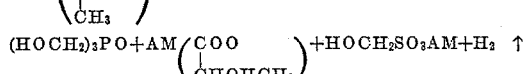

(32)
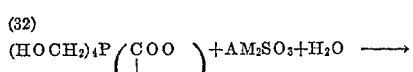
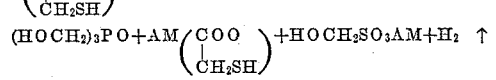

(33)
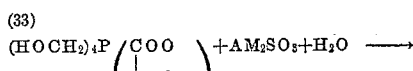
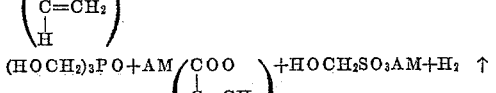

(34)
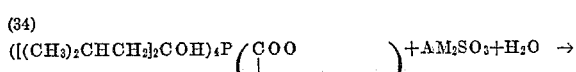
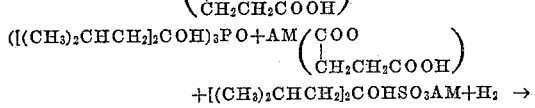

(35)
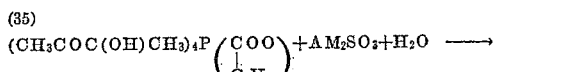
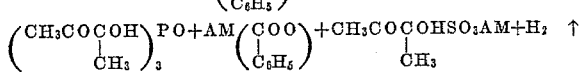

In carrying out the novel process, the tetrakis (α-hydroxyorgano) phosphonium compound, alkali metal sulfite, and water are admixed and reacted in the presence of the basic compound in a suitable reactor provided with agitating means. Sufficient alkali metal sulfite is added to the reaction mixture to provide at least the stoichiometric proportion necessary to neutralize the X component of the phosphonium compound and to form an alkali metal bisulfite with one of the hydroxyorgano radicals of the phosphonium compound. The stoichiometric proportion necessary to effect these results is equivalent to one mole of alkali metal sulfite per mole of phosphonium compound. It is preferred to add a stoichiometric excess of the alkali metal sulfite, preferably between above five and about two hundred percent stoichiometric excess, but any suitable amount may be employed.

Sufficient water is added to the reaction mixture to provide at least one mole of water per mole of tetrakis (α-hydroxyorgano) phosphonium compound, but preferably a stoichiometric excess of water up to about ten times the stoichiometric proportion is added. The excess of water in the reaction mixture preferably does not exceed the amount necessary to dissolve the phosphonium compound, the alkali metal sulfite, and the basic compound.

The alkali metal sulfite, tetrakis (α-hydroxyorgano) phosphonium compound and basic compound may be added to the reaction zone as solids, aqueous slurries, or aqueous solutions. Water may be added to the reaction mixture as water and/or as an aqueous solution of phosphonium compound, alkali metal sulfite and/or basic compound.

Any convenient order of mixing of the reactants and base may be employed. The reactants may be added to the reactor simultaneously, but preferably the alkali metal sulfite and phosphonium compound are first admixed with water and the basic compound is then added to adjust the pH of the reaction mixture to above about seven. The rate of reaction and the rate of evolution of hydrogen is increased when the pH of the reaction mixture is adjusted to within the aforesaid range.

The reaction mass is preferably agitated during the entire reaction period in order to enhance the rate of reaction and the evolution of hydrogen.

Heating of the reaction mass to a temperature in the range between about thirty and about eighty-five degrees centigrade, and preferably between about sixty and about eighty degrees centigrade, also enhances the rate of reaction. Temperatures above about eighty-five degrees centigrade should be avoided, because at temperatures higher than this the proportion of tris(α-hydroxyorgano) phosphine oxide product converted to bis(α-hydroxyorgano) phosphinic acid is markedly increased.

Evolution of hydrogen markedly diminishes or stops when the reaction is substantially complete. Generally, between about one and about four hours of reaction time are necessary to effect complete reaction, but this period may be decreased or extended, as desired, by control of the pH, the temperature and agitation, as discussed above.

The reaction mass contains tris(α-hydroxyorgano) phosphine oxide and alkali metal bisulfite salt of the aldehyde methyl ketone, or cyclic ketone, in addition to other by-products of the reaction. The tertiary phosphine oxide is readily separated from such a reaction mass by solvent extraction and/or ion exchange techniques, because the phosphine oxide is in neutral form, while the by-product organic salts have an ionic structure. In contrast, when no alkali metal sulfite is employed in the reaction, as in prior art techniques, free aldehyde, methyl ketone or cyclic ketones form in the reaction mass as by-products. These compounds and the tertiary phosphine oxide are both neutral, and costly purification steps are therefore required to recover a pure tertiary phosphine product from the reaction mass.

As indicated above, solvent extraction and/or ion exchange techniques can be employed to separate tertiary phosphine oxide from the reaction mass. In one modification of the separation technique, the reaction mass is admixed with a water immiscible solvent for the tertiary phosphine oxide to extract the tertiary phosphine oxide from the reaction mass. The phosphine oxide-bearing solvent is separated from the insoluble and immiscible components and then distilled, preferably under vacuum, to recover the tertiary phosphine oxide therefrom. Suitable water immiscible solvents include the alcohols containing between about five and about eight carbon atoms such as amyl, isoamyl, hexyl, cyclohexanol, heptyl, octyl, and the like. Nitroalkanes such as nitroethane and nitropropane may also be employed. Esters such as ethyl acetate, propyl acetate and butyl formate, and ethers such as ethyl ether, butyl ether, and bis(2-chloroethyl) ether may also be used. Any such compound which can be distilled at atmospheric pressure or under vacuum to separate it from the tertiary phosphine oxide without causing thermal decomposition of the oxide under the temperature conditions employed, can be used as a solvent.

In another modification of the separation technique, the reaction mass, with or without dilution with water, is passed through cationic and anionic exchange resins to separate and absorb cationic and anionic reaction by-products from the solution containing the neutral tertiary phosphine oxide product. It is preferred to employ the "monobed" ion exchange technique wherein the reaction solution is passed through a mixture of anionic and cationic resins. However, if desired, the solution may be passed through an anionic resin before or after passing through a cationic resin. Suitable cationic resins include acidic nuclear sulfonic acid polystyrene resin, or the corresponding carboxylic resins. Suitable anionic resins include basic quaternary amine polystyrene resin, or the corresponding polyamine resins. When the "monobed" technique is employed a mixture of one or more of the aforesaid anionic resins and one or more of the aforesaid cationic resins in chemical equivalent OH:H ratio of about 1:1 is preferably used, but other suitable proportions can be employed if desired.

In a third modification of the separation technique, a water miscible solvent for the tertiary phosphine oxide is employed. In this modification, the reaction mass containing the phosphine oxide and by-product salts is acidified with a strong acidic compound capable of adjusting the pH thereof to between about four and about seven and preferably between about five and about seven. Strong mineral acids, strong aromatic carboxylic acids, strong carboxylic acids, benzene derivatives with acidic side chains, or mixtures thereof may be employed. Typical strong mineral acids include arsenic acid, hypophosphorus acid, nitrous acid, phosphoric acid, pyrophosphoric acid, sulfuric acid, sulfurous acid, hydrochloric acid, hydrobromic acid, chloric acid, and perchloric acid. Typical examples of strong aromatic carboxylic acids are o-toluic acid, o-chlorobenzoic acid, m-chlorobenzoic acid, o-bromobenzoic acid, m-bromobenzoic acid, o-nitrobenzoic acid, p-nitrobenzoic acid, m-nitrobenzoic acid, 3,5-dinitrobenzoic acid, and salicylic acid. Typical examples of strong carboxylic acids include formic acid, fluoroacetic acid, chloroacetic acid, bromoacetic acid, iodoacetic acid, dichloroacetic acid trichloroacetic acid, α-chloropropionic acid, glycolic acid, lactic acid, methoxyacetic acid, thioglycolic acid, cyanoacetic acid, glyoxylic acid, and malonic acid. Typical examples of suitable benzene derivatives with acidic side chains are phenylpropiolic acid and o-phenylenediacetic acid.

It is preferred to employ a concentrated aqueous acid solution in order to minimize the amount of water that must be removed in the subsequent water evaporation step. Acidification of the reaction mass inhibits the conversion of tris(α-hydroxyorgano) phosphonium oxide to bis(α-hydroxyorgano) phosphinic acid in the subsequent water distillation step.

The acidified reaction mass is then vacuum distilled to remove substantially all of the water therefrom. In order to prevent hardening of the molten reaction mass, it is desirable that the reaction mass be agitated vigorously during the distillation step, and that the vacuum be slowly applied to the system.

After substantially complete separation of water from the acidified reaction mass, the dewatered residue is admixed with a suitable inert solvent of the type described above to extract the phosphine oxide. Suitable solvents include the lower alcohols such as methanol, ethanol, propanol, isopropanol, butanol or mixtures thereof. Isopropyl alcohol is particularly suitable as the solvent in this modification because by-product salts are relatively insoluble in this compound. Sufficient solvent is employed to extract substantially all of the tris(α-hydroxyorgano) phosphine oxide, the amount of solvent required depending upon the solubility of tris(α-hydroxyorgano) phosphine oxide in the particular solvent employed. For example, a maximum of about one thousand grams of tris-(hydroxymethyl) phosphine oxide will dissolve in about eight liters of boiling absolute (ninety-nine percent) isopropyl alcohol. When ethanol is employed as the solvent, a larger proportion of the oxide is dissolved therein, since the oxide is more soluble in ethanol than in isopropyl alcohol. However, a larger proportion of impurities are also dissolved in the ethanol. At least the stoichiometric proportion and preferably between about 1.5 and about four times the stoichiometric proportion of solvent is employed. Extraction of the oxide may be effected either batchwise, or by continuous countercurrent methods, or by any other suitable conventional extraction method, the type of extraction method employed constituting no part of the instant invention. The temperature of the solvent during extraction is maintained preferably at the boiling point.

Undissolved solids, which are predominantly alkali metal bisulfite aldehyde and alkali metal salts, are then separated from the resulting tris(α-hydroxyorgano) phosphine oxide solution by conventional means such as filtration, centrifuging and the like. After separation of the undissolved solids, the clarified phosphine oxide solution is distilled, preferably at atmospheric pressure first and then under a slight vacuum, ultimately reaching a temperature of about eighty degrees centigrade and a vacuum of about twenty mm. Hg in the pot. Solvent vaporized in the distillation step may be condensed, then dried if necessary, and recycled to extract additional impure phosphonium oxide. After distilling off substantially all of the solvent, the residue, which is substantially pure tris(α-hydroxyorgano) phosphine oxide in the form of a highly viscous melt, is cooled to effect solidification thereof. The rate of solidification may be increased if desired by seeding with crystals of tris (α-hydroxyorgano) phosphine oxide. Cooling may be effected by pouring the melt on a cold metal surface or by other conventional cooling means. The resulting solid is in crystalline form, and is of high yield and purity.

If desired, one of the aforesaid solvent extraction modifications may be combined with the ion exchange techniques to recover tertiary phosphine oxide from the reaction mass.

The following examples are presented to further illustrate the invention without any intention of being limited thereby. All percentages are by weight unless indicated otherwise.

*Example 1*

One thousand grams of tetrakis (hydroxymethyl) phosphonium chloride (97.7 percent pure) were dissolved in water to yield an aqueous solution containing about forty percent of the phosphonium chloride. To this solution were added six hundred and seventy-five grams of sodium sulfite while agitating the resulting mixture. The pH of the mixture was adjusted to about eleven by adding 27.4 grams of a fifty percent aqueous solution of NaOH thereto. The mixture was then heated to a temperature of about seventy-five degrees centigrade for about two hours. The reaction mixture was agitated during the entire reaction period. After completion of the reaction, twenty-eight ml. of concentrated hydrochloric acid was admixed with the reaction product, whereby the pH was adjusted to about five. The acidified mass was then distilled under vacuum until substantially free of water. During distillation, the ultimate pot temperature was ninety-five degrees centigrade and the pressure was eighty mm. Hg. The resulting viscous melt weighed eighteen hundred and forty-two grams.

A two hundred and sixty-three gram portion of the melt (14.3 percent of the total melt) was admixed with eight hundred ml. of boiling absolute (ninety-nine percent) isopropyl alcohol and then filtered. The solid residue was re-extracted in the same manner with three additional eight hundred ml. portions of boiling isopropyl alcohol. The four portions of isopropyl alcohol containing dissolved tris(hydroxymethyl) phosphine oxide were combined, and the combined solution was distilled (ultimate conditions: pot temperature, eighty degrees centigrade, twenty mm. Hg) to volatilize substantially all of the isopropyl alcohol. The residue was solidified by cooling and collected. Analyses of the crystalline product in accordance with the benzoyl chloride method disclosed by Hoffman, Journal of the American Chemical Society, vol. 43, pp. 1684–1688, established that the product contained 96.5 percent tris(hydroxymethyl) phosphine oxide, 0.98 percent NaCl and no formaldehyde.

The pure crystalline product was obtained in nearly theoretical yield. Infrared analyses confirmed the qualitative identity of the product as tris(hydroxymethyl) phosphine oxide.

For purposes of comparison, when tetrakis (hydroxymethyl) phosphonium chloride is reacted with sodium hydroxide in the absence of sodium bisulfite, in accordance with the process disclosed in the aforesaid references of Hoffman, the phosphine oxide is highly contaminated with formaldehyde, and isolation of a pure phosphine oxide could not be readily attained.

*Example 2*

Tetrakis (hydroxymethyl) phosphonium bromide (23.5 grams) was dissolved in one hundred and eighteen grams of water with agitation at a temperature of about fifty-five degrees centigrade. Sodium sulfite (13.2 grams) was added to this solution, and the pH of the resulting mixture was adjusted to about ten with fifty percent aqueous sodium hydroxide solution. This mixture was agitated and heated to a temperature of about seventy degrees centigrade for about one hour. At the end of this period the pH of the reaction mass was adjusted to about 6.5 with concentrated reagent grade hydrochloric acid. The acidified mass was then distilled under vacuum (eighty-five degrees centigrade, eighty millimeters Hg) until substantially free of water. The dewatered slurry was admixed with one hundred milliliters of boiling isopropyl alcohol for about one-half an hour and then filtered. The solid residue was re-extracted in the same manner with two additional one hundred milliliter portions of boiling isopropyl alcohol. The three portions of isopropyl alcohol containing dissolved tris(hydroxymethyl) phosphine oxide were combined and the combined solution was distilled to volatilize substantially all of the isopropyl alcohol. The residue was solidified by cooling, affording a yield of about one hundred percent tris (hydroxymethyl) phosphine oxide, based upon the weight of tetrakis(hydroxymethyl) phosphonium bromide employed as a reactant.

To further purify the phosphine oxide product, it was dissolved in one hundred milliliters of distilled water and the resulting solution was passed through a one hundred milliliter column packed with an ion exchange resin (sold commercially under the trade name "Amberlite MB-1"), comprised of a mixture of an acidic nuclear sulfonic acid polystyrene resin and a basic quaternary amine polystyrene resin. The purified solution recovered from the ion exchange column was collected and distilled under vacuum (ninety-five degrees centigrade, twenty-two millimeters Hg), until substantially free of water. Analyses of the crystalline tris(hydroxymethyl) phosphine oxide product by the aforesaid benzoyl chloride method showed that the product contained about ninety-five percent tris-(hydroxymethyl) phosphine oxide. Infrared analyses confirmed the qualitative identity of the product.

*Example 3*

The procedure of Example 2 was repeated, employing the following reactants in the following proportions:

| | Grams |
|---|---|
| Tetrakis(hydroxymethyl) phosphonium acetate | 21.4 |
| Water | 107.0 |
| Sodium sulfite | 13.3 |

The residue remaining after separation of the isopropyl alcohol solvent represented a yield of tris(hydroxymethyl) phosphine oxide equivalent to about seventy-five percent of the stoichiometric yield. Chemical analyses, as determined by the aforesaid benzoyl chloride method and infrared analysis showed that the crystalline product recovered after purification with the ion exchange resin, contained about ninety percent tris(hydroxymethyl) phosphine oxide.

It will be recognized by those skilled in the art that various modifications within the invention are possible, some of which have been referred to above. Therefore, I do not wish to be limited except as defined by the appended claims.

I claim:

1. A process for preparing a tris (α-hydroxyorgano) phosphine oxide which comprises reacting, in an alkaline medium, water, an alkali metal sulfite and a tetrakis (α-hydroxyorgano) phosphonium compound capable of forming a compound selected from the group consisting of aldehydes, methyl ketones and cyclic ketones in an alkaline medium, and recovering the tris (α-hydroxyorgano) phosphine oxide from the reaction mass.

2. A process for preparing a tris (α-hydroxyorgano) phosphine oxide which comprises reacting, in an alkaline medium, water, an alkali metal sulfite and a tetrakis (α-hydroxyorgano) phosphonium compound, capable of forming a compound selected from the group consisting of aldehydes, methyl ketones and cyclic ketones in an alkaline medium thereby forming a reaction mass containing tris (α-hydroxyorgano) phosphine oxide, and mixing said reaction mass with an inert water immiscible solvent for said tris (α-hydroxyorgano) phosphine oxide, separating the resulting tris (α-hydroxyorgano) phosphine oxide-containing solvent from the remainder of the reaction mass, and recovering tris (α-hydroxyorgano) phosphine oxide from said solvent.

3. The process as claimed in claim 2 wherein said solvent is selected from the group consisting of water immiscible alcohols, water immiscible nitroalkanes, water immiscible esters, and water immiscible ethers.

4. A process for preparing a tris (α-hydroxyorgano) phosphine oxide which comprises reacting in an alkaline medium, water, an alkali metal sulfite, and a tetrakis (α-hydroxyorgano) phosphonium compound capable of forming a compound selected from the group consisting of aldehydes, methyl ketones and cyclic ketones in an alkaline medium, thereby producing a reaction mass containing tris (α-hydroxyorgano) phosphine oxide, acidifying the reaction mass, distilling water therefrom, admixing the dewatered reaction mass with an inert solvent for said tris (α-hydroxyorgano) phosphine oxide, separating the resulting tris (α-hydroxyorgano) phosphine oxide-containing solvent from the remainder of the dewatered mass, and recovering tris (α-hydroxyorgano) phosphine oxide from said solvent.

5. The process as claimed in claim 4 wherein said solvent is a lower alcohol.

6. A process for preparing a tris (α-hydroxyorgano) phosphine oxide which comprises reacting in an alkaline medium, water, an alkali metal sulfite, and a tetrakis (α-hydroxyorgano) phosphonium compound capable of forming a compound selected from the group consisting of aldehydes, methyl ketones, and cyclic ketones in an alkaline medium, thereby producing an aqueous reaction mass containing tris (α-hydroxyorgano) phosphine oxide and by-product salts, contacting said reaction mass with a cation exchange resin and an anionic exchange resin to remove said by-product salts from the reaction mass, separating the resulting purified aqueous solution of tris (α-hydroxyorgano) phosphine oxide from the resins, and recovering tris (α-hydroxyorgano) phosphine oxide from said aqueous solution.

7. A process for preparing a tris (α-hydroxyorgano) phosphine oxide which comprises admixing water, an alkali metal sulfite, and a tetrakis (α-hydroxyorgano) phosphonium compound capable of forming a compound selected from the group consisting of aldehydes, methyl ketones and cyclic ketones in an alkaline medium, adjusting the pH of the resulting mixture to between about 9.0 and about 11.5 with a strong basic compound, heating the resulting basic mixture to a temperature less than about 85° C., whereby an aqueous slurry containing a tris (α-hydroxyorgano) phosphine oxide an alkali metal salt is produced, adjusting the pH of said slurry to between about 4 and about 7 with a strong acid, evaporating substantially all of the water from said acidified slurry, admixing the resulting dewatered residue with an inert lower alcohol solvent, whereby tris (α-hydroxyorgano) phosphine oxide is dissolved in said alcohol solvent, separating the insoluble material from the resulting alcohol solution, distilling the alcohol from said alcohol solution, and recovering substantially pure tris (α-hydroxyorgano) phosphine oxide from the alcohol distillation residue.

8. A process for preparing tris (α-hydroxyorgano) phosphine oxide which comprises admixing water, an alkali metal sulfite, and a tetrakis (α-hydroxyorgano) phosphonium compound represented by the formula:

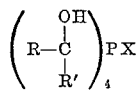

wherein R and R' are selected from the group consisting of hydrogen, alkyl, aryl, cycloalkyl, haloalkyl, haloaryl, and cyclohaloalkyl, and X is a monovalent anion of an acid selected from the group consisting of hydrohalic acids, sulfuric acid, sulfurous acid, phosphoric acid, phosphorous acid, pyrophosphoric acid, hypophosphorous acid, aliphatic carboxylic acids containing no more than 9 carbon atoms, aromatic carboxylic acids containing no more than 12 carbon atoms, aliphatic dibasic acids containing no more than 10 carbon atoms and aromatic polybasic carboxylic acids containing no more than 12 carbon atoms, adjusting the pH of the resulting mixture to between about 9.0 and about 11.5 with a strong basic compound, heating the resulting basic mixture to a temperature less than about 85° C., whereby an aqueous slurry containing tris (α-hydroxyorgano) phosphine oxide and alkali metal salts is produced, adjusting the pH of said slurry to between about 4 and about 7 with a strong acid, evaporating substantially all of the water from said acidified slurry, admixing the resulting dewatered residue with an inert lower alcohol solvent, whereby tris (α-hydroxyorgano) phosphine oxide is dissolved in said alcohol solvent solution, distilling the alcohol from said alcohol solution, and recovering substantially pure tris (α-hydroxyorgano) phosphine oxide from the alcohol distillation residue.

9. The process of claim 8 wherein the molar ratio of said alkali metal sulfite to said tetrakis (α-hydroxyorgano) phosphonium compound is between about 1:1 and about 3:1.

10. The process as claimed in claim 8 wherein the molar ratio of water to said tetrakis (α-hydroxyorgano) phosphonium compound is between about 1:1 and about 10:1.

11. The process of claim 8 wherein said tetrakis (α-hydroxyorgano) phosphonium compound is tetrakis (hydroxymethyl) phosphonium chloride.

12. The process of claim 8 wherein said tetrakis (α-hydroxymethyl) phosphonium compound is tetrakis (hydroxymethyl) phosphonium bromide.

13. The process of claim 8 wherein said tetrakis (α-hydroxymethyl) phosphonium compound is tetrakis (hydroxymethyl) phosphonium acetate.

14. The process as claimed in claim 8 wherein the tris (α-hydroxyorgano) phosphine oxide is dissolved from said dewatered residue with said lower alcohol solvent maintained at its boiling temperature.

15. The process as claimed in claim 8 wherein the alcohol distilled from said insoluble material is dried and recycled for extraction of tris (α-hydroxyorgano) phosphine oxide from additional dewatered residue.

16. The process for preparing tris (hydroxymethyl) phosphine oxide which comprises admixing water, an alkali metal sulfite and tetrakis (hydroxymethyl) phosphonium chloride in proportions equivalent to a molar ratio of alkali metal sulfite to said phosphonium chloride of between about 1:1 and about 3:1, and a molar ratio of water to said phosphonium chloride of between about 1:1 and about 10:1, adjusting the pH of the resulting mixture to between about 9.0 and about 11.5, with a strong basic compound, heating the resulting basic mixture to a temperature between about thirty degrees centigrade and about eighty-five degrees centigrade, whereby an aqueous slurry containing tris(hydroxymethyl) phosphine oxide and alkali metal salts is produced, adjusting the pH of said slurry to between about four and about seven with a strong acid, evaporating substantially all of the water from said acidified slurry, admixing the resulting dewatered residue with an inert lower alcohol solvent, whereby tris(hydroxymethyl) phosphine oxide is dissolved in said alcohol solvent, separating the insoluble material from the resulting alcohol solution, distilling the alcohol from said alcohol solution, and recovering substantially pure tris(hydroxymethyl) phosphine oxide from the alcohol distillation residue.

17. The process for preparing tris (hydroxymethyl) phosphine oxide which comprises admixing water, an alkali metal sulfite and tetrakis (hydroxymethyl) phosphonium bromide in proportions equivalent to a molar ratio of alkali metal sulfite to said phosphonium bromide of between about 1:1 and about 3:1, and a molar ratio of water to said phosphonium bromide of between about 1:1 and about 10:1, adjusting the pH of the resulting mixture to between about 9.0 and about 11.5 with a strong basic compound, heating the resulting basic mixture to a temperature between about thirty degrees centigrade and about eighty-five degrees centigrade, whereby an aqueous slurry containing tris(hydroxymethyl) phosphine oxide and alkali metal salts is produced, adjusting the pH of said slurry to between about four and about seven with a strong acid, evaporating substantially all of the water from said acidified slurry, admixing the resulting dewatered residue with an inert lower alcohol solvent, whereby tris(hydroxymethyl) phosphine oxide is dissolved in said alcohol, separating the insoluble material from the resulting alcohol solution, distilling the alcohol solvent from said alcohol solution, and recovering substantially pure tris(hydroxymethyl) phosphine oxide from the alcohol distillation residue.

18. The process for preparing tris(hydroxymethyl) phosphine oxide which comprises admixing water, an alkali metal sulfite and tetrakis (hydroxymethyl) phosphonium acetate in proportions equivalent to a molar ratio of alkali metal sulfite to said phosphonium acetate of between about 1:1 and about 3:1, and a molar ratio of water to said phosphonium acetate of between about 1:1 and about 10:1, adjusting the pH of the resulting mixture to between about 9.0 and about 11.5 with a strong basic compound, heating the resulting basic mixture to a temperature between about thirty degrees centigrade and about eighty-five degrees centigrade, whereby an aqueous slurry containing tris(hydroxymethyl) phosphine oxide and alkali metal salts is produced, adjusting the pH of said slurry to between about four and about seven with a strong acid, evaporating substantially all of the water from said acidified slurry, admixing the resulting dewatered residue with an inert lower alcohol solvent whereby tris(hydroxymethyl) phosphine oxide is dissolved in said alcohol solvent, separating the insoluble material from the resulting alcohol solution, distilling the alcohol solvent from said alcohol solution, and recovering substantially pure tris (hyrdoxymethyl) phosphine oxide from the alcohol distillation residue.

19. The process for preparing tris (hydroxymethyl) phosphine oxide, which comprises admixing water, sodium sulfite and tetrakis (hydroxymethyl) phosphonium chloride in proportions equivalent to a molar ratio of sodium sulfite to said phosphonium chloride of between about 1:1 and about 3:1, and a molar ratio of water to said phosphonium chloride of between about 1:1 and about 10:1, adjusting the pH of the resulting mixture to between about 9.0 and about 11.5 with sodium hydroxide, heating the resulting basic mixture to a temperature between about sixty and about eighty degrees centigrade, whereby an aqueous slurry containing tris(hydroxymethyl) phosphine oxide and sodium salts is produced, adjusting the pH of said slurry to between about four and about seven with hydrochloric acid, evaporating substantially all of the water from said acidified slurry, admixing the resulting dewatered residue with boiling isopropyl alcohol, whereby tris(hydroxymethyl) phosphine oxide is dissolved in said alcohol, separating the insoluble materials from the resulting alcohol solution, distilling the alcohol from said alcohol solution, and recovering substantially pure crystalline tris(hydroxymethyl) phosphine oxide from the alcohol distillation residue.

20. The process of claim 19 wherein the alcohol recovered in the alcohol solution distillation step is dried and recycled to dissolve tris(hydroxymethyl) phosphine oxide from an additional portion of said dewatered residue.

No references cited.

UNITED STATES PATENT OFFICE
CERTIFICATE OF CORRECTION

Patent No. 3,076,034                    January 29, 1963

Irving Gordon

It is hereby certified that error appears in the above numbered patent requiring correction and that the said Letters Patent should read as corrected below.

Column 7, line 36, for "⟶" read -- ↑ --; column 14, lines 16 and 64, after "alcohol", each occurrence, insert -- solvent --; same column 14, line 66, for "(hyrdoxymethyl)" read -- (hydroxymethyl) --.

Signed and sealed this 22nd day of June 1965.

(SEAL)
Attest:

ERNEST W. SWIDER
Attesting Officer

EDWARD J. BRENNER
Commissioner of Patents